April 7, 1959  J. E. CONNOLLY  2,881,032
COMBINATION RADIAL AND END-THRUST BEARING
Filed Feb. 9, 1954
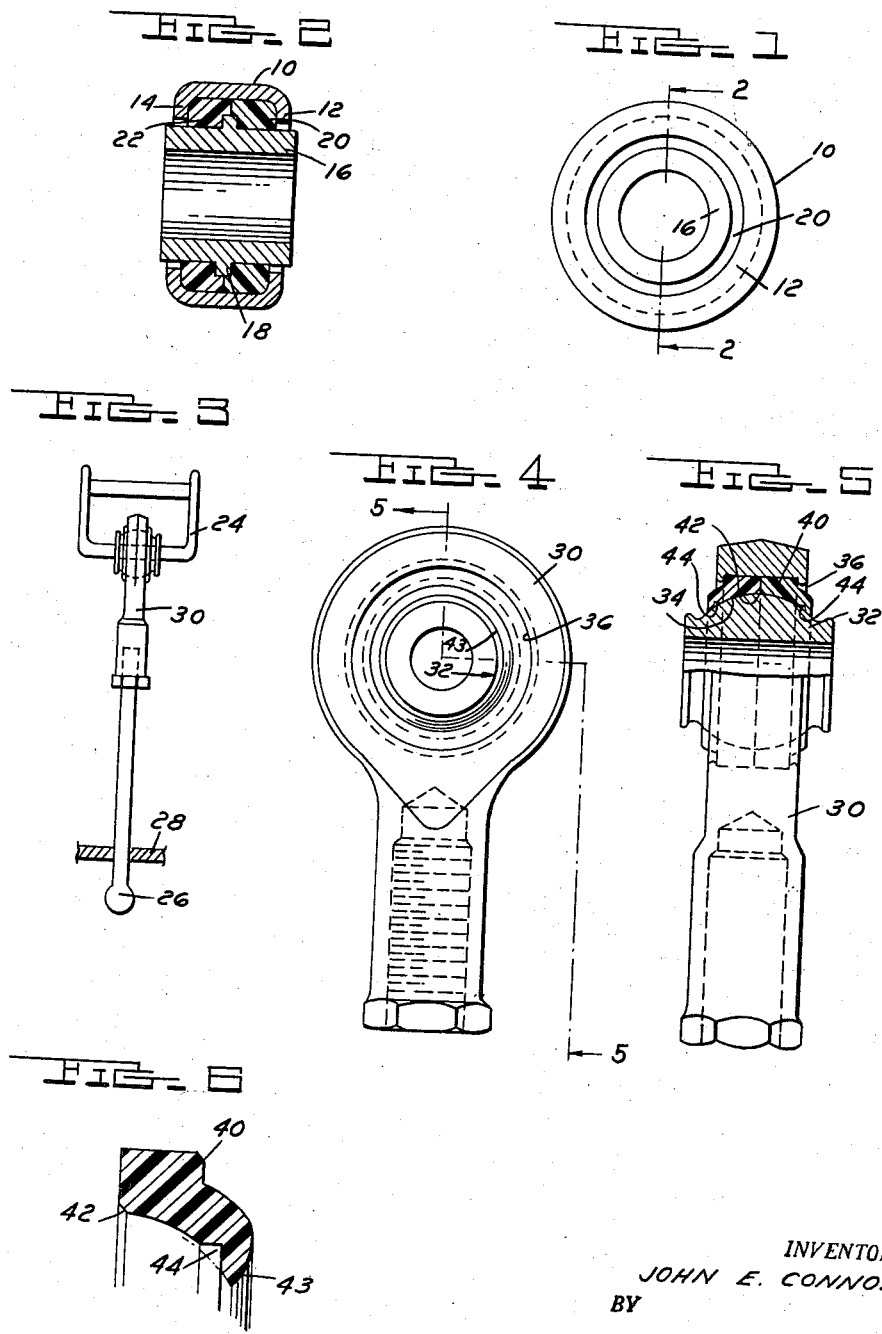
INVENTOR
JOHN E. CONNOLLY
BY
Barnes, Kisselle, Laughlin & Raisch
ATTORNEYS April 7, 1959         J. E. CONNOLLY         2,881,032
COMBINATION RADIAL AND END-THRUST BEARING
Filed Feb. 9, 1954         3 Sheets-Sheet 2
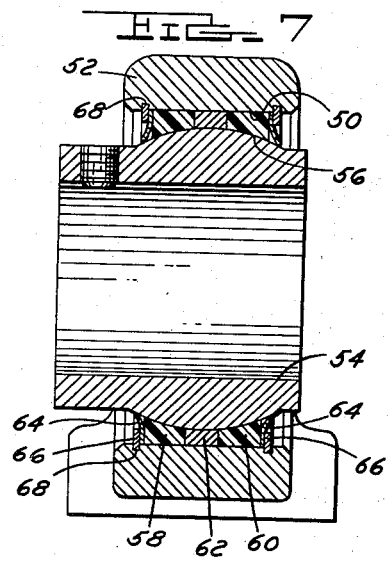
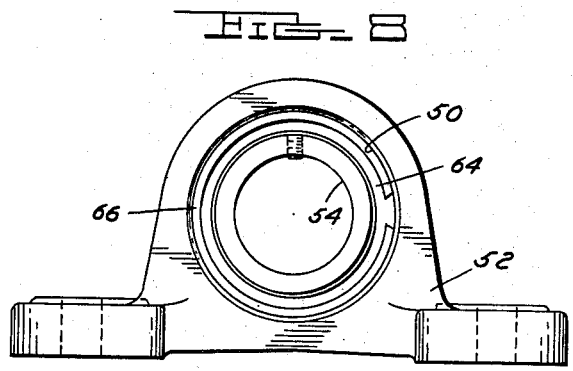
INVENTOR.
JOHN E. CONNOLLY
BY
ATTORNEYS

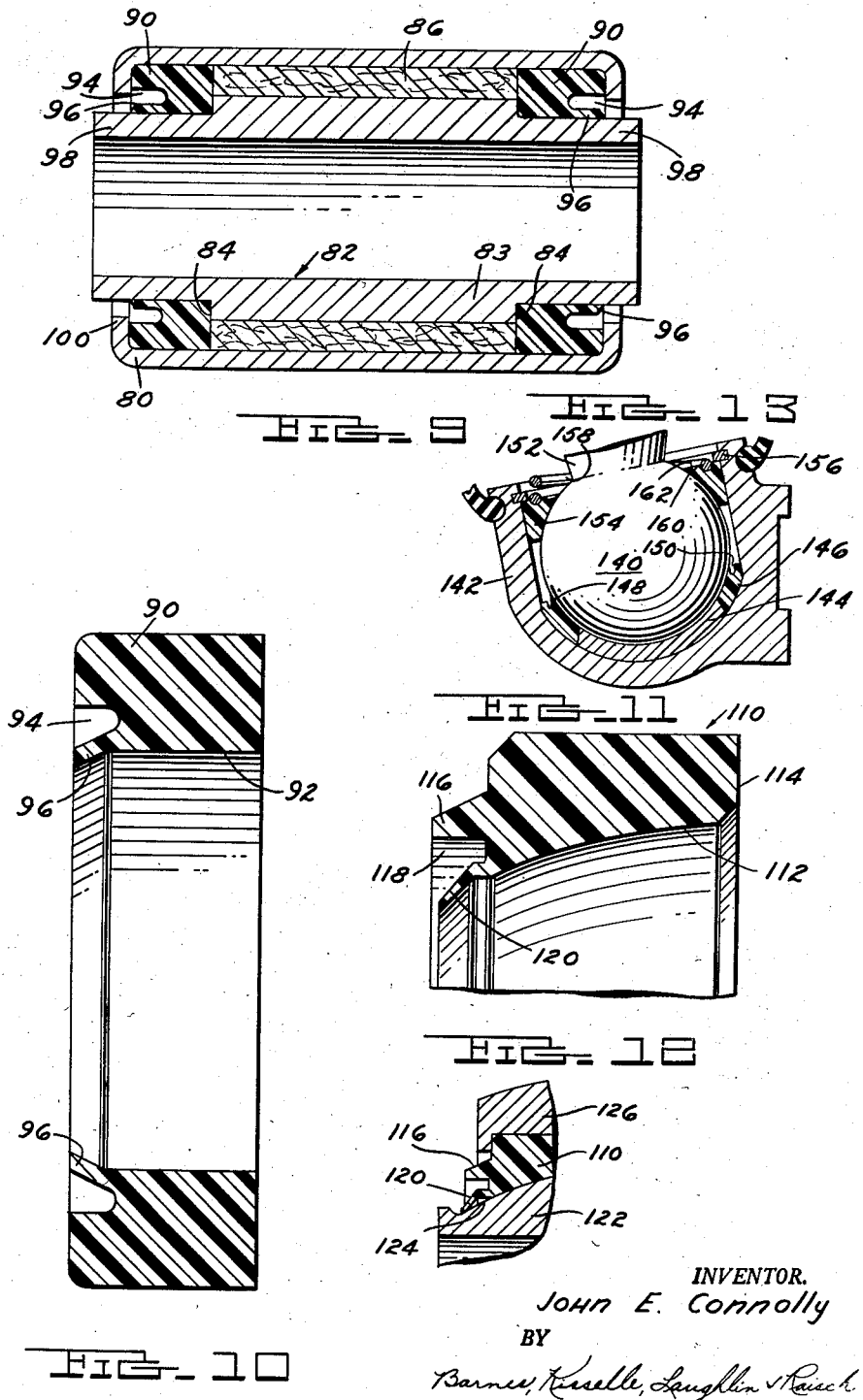

United States Patent Office 2,881,032
Patented Apr. 7, 1959

2,881,032

COMBINATION RADIAL AND END-THRUST BEARING

John E. Connolly, Whitmore Lake, Mich., assignor to O&S Bearing & Mfg. Co., Whitmore Lake, Mich., a corporation of Michigan Application February 9, 1954, Serial No. 409,030

5 Claims. (Cl. 308—36.1)

This invention relates to an improved bearing and has particularly to do with a composite type of bearing which is formed of an outer shell, an inner bearing member and an interposed bearing material.

It is an object of the invention to provide a bearing which has a construction capable of receiving radial and axial loads and which is extremely simple in design.

Another object of the invention is the provision of a bearing which is relatively simple to manufacture, thus cutting down the manufacturing costs so that the device may be acceptable for production parts in automotive vehicles and other machines where cost is of vital importance.

Briefly, the invention consists of a bearing having an outer shell with inwardly extending spaced walls, an inner shell having a longitudinally varying contour and a pair of members confined in said shell complementally matching the inner bearing members to provide a snug construction which permits rotation without endwise motion.

Other objects and features of the invention relating to details of construction as, for example, the provision of lubricant pockets and various means for forming the retaining walls, will be evident in the following description and claims.

Another specific object of the invention is the use of a portion of the bearing material for sealing the bearing against dirt and dust. This can either be accomplished with an integral portion of the bearing, as in one modification, or with a supplemental unit of bearing material.

Drawings accompany the disclosure, and the various views thereof may be briefly described as:

Figure 1, a side elevation of an assembled bearing constructed according to the present invention.

Figure 2, a sectional view of the bearing on line 2—2 of Figure 1.

Figure 3, an assembly view of a control rod part showing the use of a bearing constructed according to the present invention.

Figure 4, a side elevation of the bearing of Figure 3.

Figure 5, a sectional view on line 5—5 of Figure 4.

Figure 6, a sectional view of one of the bearing inserts of Figure 5 prior to assembly.

Figure 7, a sectional view of a pillow-block type of bearing utilizing the invention.

Figure 8, a side view of the bearing shown in Figure 7.

Figure 9, a longitudinal section of a modified type bearing in assembly.

Figure 10, an enlarged view of the sealing insert shown in Figure 9.

Figure 11, a partial section of a modified type of bearing insert with a sealing lip.

Figure 12, a view of the insert of Figure 11 in assembly.

Figure 13, a sectional view of a modified type bearing in assembly utilizing the sealing arrangement.

Referring to the drawings, in Figures 1 and 2 a bearing is shown with an outer shell member 10 formed of sheet metal and having inwardly extending spaced walls 12 and 14. An inner bearing 16 is disposed concentric with the shell 10 and has an annular ridge 18 spaced between walls 12 and 14.

Confined within the shell 10 and complemental to the bearing member 16 are bearing rings 20 and 22 formed of a plastic material, such as nylon. These rings 20 and 22 are recessed at their abutting surface to receive the ridge 18. When this assembly of parts is put together under a slight pressure from shell 10, the device is ready for operation.

In Figure 3, a yoke 24, which may be used for controlling a throttle or heater or any other accessory, is to be controlled by a rod 26 extending through a dash panel 28, for example. The control rod 26 extends into a knuckle bearing 30 which provides the outer housing of the bearing assembly to be described.

The inner bearing 32 has a spherical surface 34 concentric with the recess in the housing 30. This inner bearing is preferably chromium plated to resist wear and oxidation. Bushings 40 are provided to slip within the housing 30 and to abut around the member 32. The edges of the housing 30 around the bearing recess may then be swedged or spun to form spaced inwardly extending retaining walls 36 confining the bushings 40. The inner corners of the bushings 40 are chamfered so that in abutment the chamfered portions form an annular groove 42 which may serve as a lubricant-retaining chamber.

As shown in Figure 6, the bushings 40 prior to assembly have an inwardly extending annular rim portion 43 spaced from the load-bearing portion which has a radius of about .001 inch less than the normal radius of the bearing. An annular groove 44 is provided adjacent this rim 43 to serve as a lubricant receiving chamber.

When the bearing is assembled, the rim 43 is forced outwardly to the diameter of the inner member so that it has the same effective diameter as the remainder of the inner surface of the bearing member 40. The bushing 40 is preferably made of a plastic material having good bearing characteristics such as nylon, and the character of this material is such that a pressure will be exerted along the rim 43 around the inner bearing member to serve as a seal for the assembly. The groove 44 while not necessary for the purpose will facilitate the deflection required for the rim portion 43 in assembly.

The grooves 42 and 44 have been referred to as lubricant-retaining chambers. The lubricant which is retained in these grooves is known as the "O. and S. 252 Compound," particularly as disclosed specificially in Delp Patent No. 2,379,478, issued July 3, 1945. This material is relatively solid, that is, non-flowable, at room temperature, and it would be worked by the motion of the bearing between the surfaces of the bearing members to provide what is commonly referred to as a "self-lubricating" bearing.

In Figure 7 a slightly modified construction is shown embodying the principles of the invention. In this arrangement the bearing recess 50 is formed in a pillow block 52. The inner bearing member 54 has a spherical surface 56 concentric with the bearing opening of the pillow block. Surrounding and complemental to the outer surface of the bearing member 54 and the inner surface of the bearing member 52 are bushing members 58 and 60 disposed on either side of a lubricant-impregnated ring 62.

Bearing members 58 and 60 are preferably formed of a plastic material, such as nylon, having good bearing characteristics. The ring 62 is preferably formed of a fibrous material such as a fabric and impregnated with a suitable lubricant which can be distributed to all of the bearing surfaces by the action of the bearing.

Sealing rings 64 are clamped against the outer surfaces of bushings 58 and 60 by snap rings 66 which form the inwardly extending retaining walls for the outer member 52. These rings 66 are seated in annular grooves 68 at the edges of the bearing recess 50. The sealing rings are preferably formed of nylon plastic and flat before assembly. The shape assumed in assembly, Figure 7, insures positive sealing pressure, and the nylon has a bearing contact with the inner member which would be impossible with a metal ring.

In Figures 9 and 10 a modified construction is shown which in assembly consists of an outer shell 80 and an inner bearing member 82 having an enlarged central portion 83 terminating at shoulders 84. Between the inner and outer members a fabric bearing insert 86 is interposed above the enlarged portion 83. Abutting the shoulders 84 and the ends of the fabric insert 86 are circular plastic inserts 90 shown in detail in Figure 10 prior to assembly. These inserts are preferably made from nylon or "Teflon," a hard, tough plastic material having good bearing characteristics.

It will be noted particularly from Figure 10 that the inserts 90 are provided with a primary load-bearing inner bore 92 and at the outer sides, spaced from the load-bearing portion, with an annular recess 94 which lies above a sealing lip 96. The inner surface of the sealing lip 96 is tapered inwardly to a smaller diameter than the main bore 92. However, in assembly, as shown in Figure 9, the lip portion 96 is moved outwardly so that the inherent resilience of the material from which the inserts 90 are formed bears constantly on the lip 96 and against the ends 98 of the inner member 82.

The parts are assembled under pressure, the fabric 86 being impregnated with a lubricant and compressed into position radially and axially. There is also an endwise pressure on the members 90 by the inturned flanges 100 of the outer member 80, thus insuring positive contact between the members 90 and the shoulders 84 to provide a double seal for the composite bearing, the first seal being under the lip 96 and the second seal being at the shoulders 84.

In Figure 11, a modified insert is shown of the type which may be utilized in the assembly of Figure 5. This insert has a main body portion 110 with a spherical inner surface 112. The surface 114 at one end of the insert 110 is for contact with an identical surface of a complemental part. At the other end of the insert spaced from the load-bearing portion, an annular axial projection 116 provides a cavity 118 into which projects a lip extension 120 having a tapered cross section enlarging from the outer edge toward the body. The lip 120 projects inwardly to a smaller diameter than the continuation of the spherical surface 112 so that in assembly over a spherical inner bearing member 122 (see Figure 12) the lip 120 is moved out against its inherent resilience so that it will bear against the surface 124 of the inner member 122 to provide a sealing contact at all times.

Insert 110 is preferably made of either nylon or "Teflon" or an equivalent material having bearing characteristics and toughness in addition to an inherent resilience. The outer bearing member 126 confines the insert 110 externally and holds the combination in assembly as shown in Figure 5.

In Figure 13 a modified construction is shown in which a ball member 140 is confined in a housing 142. A lubricant-impregnated fabric pad 144 is surrounded by a confining ring 146 formed of nylon or "Teflon" or an equivalent plastic material. This ring has slightly less operative radial dimension than the pad 144, such that it will take up shock loads to protect the fabric material. The ring has a lip 148 formed inside of a groove 150 at the upper edge of the ring. The lip 148 is formed with an internal diameter smaller than the basic internal diameter of the ring 146 so that it has a definite lineal contact with the ball.

At the top of the ball on the surface of convergence toward the stud 152 is a ring 154 of plastic material of the type above mentioned. Ring 154 is confined by a snap ring 156 and is also urged to position by a coil spring 158, the upper end of which is not shown. This construction is fully disclosed in a co-pending application Serial No. 418,857, filed March 26, 1954. The present application is a continuation-in-part of application Serial No. 340,616, filed March 5, 1953, now Patent No. 2,814,538.

The ring 154 also has a lip 160 inside of a groove 162 having an internal diameter smaller than the effective diameter of the ring so that the lip will be urged outwardly against its own inherent resilience by the assembling pressures, thus forming at this point another seal against dirt and foreign matter.

I claim:

1. A bearing assembly comprising an outer cylindrical member and an inner cylindrical member having an enlarged portion of shorter axial length than the outer member with shoulders at each end the enlarged portion, a fibrous lubricant-absorbent material interposed between said enlarged portion and said outer shell and a plastic ring material at each end of said members having a solid load-bearing portion interposed between said members and axially confined by said shoulders on the inner member and by inturned portions on the outer member, said plastic members each having an annular groove on the outer radial surface thereof and the portion of said plastic members inside said groove but axially outside said load-bearing portion having a normal dimension smaller than said inner member and being deflected outwardly against the inherent resilience of said material by said inner member to provide a seal against foreign matter.

2. A bearing assembly comprising inner and outer members having a circular sectional shape, a pad of lubricant-impregnated material interposed between said members to serve as a load-carrying insert and a load-sharing plastic insert surrounding said inner member and confining said material, said plastic insert having a lip formed at at least one edge bearing against said inner member in an annular lineal contact by reason of the inherent resilience of the plastic material to serve as a seal against the introduction of foreign matter to said fibrous material.

3. A bearing having relatively rotatable inner and outer members, at least one of said members having an axially varying contour with a radial dimension increasing in an axial inward direction of the bearing, and load-bearing members interposed between said rotatable members and having bearing surface contour conforming to the axially varying contour of said one member, and sealing means formed integrally with the outer edges of said load-bearing members to contact the inner rotatable member in a rotatable sealing relation comprising a projecting lip having a smaller formed diameter than the outer diameter of the inner rotatable member at the line of contact with the inner rotatable member, said load-bearing members being shaped to receive radial and axial thrust loads on said rotatable members and said lips being positioned in assembly to exert an annular lineal sealing pressure against said inner rotatable member, and means on said outer rotatable member to confine said load-bearing members under pressure axially in assembly.

4. A bearing assembly as defined in claim 3 in which the relatively rotatable inner and outer members comprise ball and socket members, and the load-bearing members interposed between said rotatable members comprise a pad of lubricant impregnated material and annular rings of plastic material, said rings each acting on areas of convergence of opposite sides of said ball with spheroidal surfaces and each having a lip portion with a normal diameter smaller than that of the ball at the line of contact, said lips being urged outwardly to the diameter of the ball at the line of contact against the inherent resilience of the material to provide annular lineal sealing.

5. A bearing assembly as defined in claim 3 in which the outer edges of the load-bearing members are provided with an annular groove spaced from but adjacent the inner surface of said load-bearing members, the material of said load-bearing members forming the radially inner side of the groove being the sealing lip and being shaped to extend axially and inwardly in a dog-leg cross-section whereby in assembly the inner bearing member moves said lip outwardly against the inherent resilience of the bearing material to create an annular lineal seal on said inner member and to form directly within said seal an annular lubricant-retaining pocket.

References Cited in the file of this patent

UNITED STATES PATENTS

| | | |
|---|---|---|
| 2,276,349 | Scully et al. | Mar. 17, 1942 |
| 2,488,775 | Heim | Nov. 22, 1949 |
| 2,520,092 | Fredrickson et al. | Aug. 22, 1950 |
| 2,587,405 | Stevens et al. | Feb. 26, 1952 |
| 2,615,763 | Wolford | Oct. 28, 1952 |
| 2,626,839 | Creson et al. | Jan. 27, 1953 |
| 2,639,198 | Kirkham | May 19, 1953 |
| 2,704,232 | Johnston et al. | Mar. 15, 1955 |